(12) United States Patent
Jones et al.

(10) Patent No.: US 10,874,229 B2
(45) Date of Patent: Dec. 29, 2020

(54) PRODUCT DISPLAY UNIT WITH VIBRATION SENSORS

(71) Applicant: Walmart Apollo, LLC, Bentonville, AR (US)

(72) Inventors: Nicholaus A. Jones, Fayetteville, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 202 days.

(21) Appl. No.: 15/809,005

(22) Filed: Nov. 10, 2017

(65) Prior Publication Data

US 2018/0125267 A1 May 10, 2018

Related U.S. Application Data

(60) Provisional application No. 62/420,045, filed on Nov. 10, 2016.

(51) Int. Cl.
*A47F 9/02* (2006.01)
*G06Q 10/08* (2012.01)
(Continued)

(52) U.S. Cl.
CPC .............. *A47F 10/00* (2013.01); *A47F 10/02* (2013.01); *G06Q 10/087* (2013.01); *A47F 2010/025* (2013.01)

(58) Field of Classification Search
None
See application file for complete search history.

(56) References Cited

U.S. PATENT DOCUMENTS

| 7,356,495 B2 | 4/2008 | Beigl |
| 8,140,185 B2 | 3/2012 | Simmons |

(Continued)

OTHER PUBLICATIONS

"The NeWave® Sensor Solutions 'Smart Shelf' a New Solution for Dramatically Improving Merchandise Availability"; NeWave Sensor Solutions; http://www.newaverfid.com/Documents/NeWave_Smart_Shelf.pdf; published Aug. 31, 2016; pp. 1-2.

(Continued)

*Primary Examiner* — Allen C Chein
*Assistant Examiner* — Denisse Y Ortiz Roman
(74) *Attorney, Agent, or Firm* — Fitch, Even, Tabin & Flannery LLP

(57) ABSTRACT

In some embodiments, apparatuses and methods are provided herein useful to determining an action to be performed based on vibrations detected on a product display unit. In some embodiments, a system for determining an action to perform based on vibrations comprises the product display unit, one or more vibration sensors, the one or more vibration sensors affixed to the product display unit and configured to detect vibration of the product display unit and transmit an indication of the vibration of the product display unit, and a control circuit communicatively coupled to the one or more vibration sensors and configured to receive, from the one or more vibration sensors, the indication of the vibration, estimate, based on the indication of the vibration a characteristic of at least one item on the product display unit, and determine, based on the characteristic, the action to be performed.

20 Claims, 3 Drawing Sheets

(51) Int. Cl.
    *A47F 10/00*    (2006.01)
    *A47F 10/02*    (2006.01)

(56) References Cited

U.S. PATENT DOCUMENTS

| | | | |
|---|---|---|---|
| 8,777,114 | B2 | 7/2014 | Bowman |
| 8,941,495 | B2 | 1/2015 | Wiese |
| 9,280,757 | B2 * | 3/2016 | Parpia .................. G06Q 10/087 |
| 10,037,662 | B2 * | 7/2018 | King .................. G08B 13/1436 |
| 2005/0161420 | A1 | 7/2005 | Hardy |
| 2010/0039252 | A1 | 2/2010 | Barkus |
| 2013/0117053 | A2 | 5/2013 | Campbell |
| 2014/0006229 | A1 * | 1/2014 | Birch .................. G06Q 10/087 705/28 |
| 2014/0055244 | A1 | 2/2014 | Burchell |
| 2016/0086460 | A1 * | 3/2016 | King ................ G08B 13/19695 340/572.1 |
| 2017/0286898 | A1 * | 10/2017 | Ryan, III ........... G06Q 30/0639 |

OTHER PUBLICATIONS

Ahearn, Brianna; "Sensors Empower Retailers for Sales and Reduced Shrink"; http://www.innovativeretailtechnologies.com/doc/sensorsempowerretailersforsalesandreducedshrink0001; published May 28, 2015; pp. 1-2.

PCT; App. No. PCT/US2017/061010; International Search Report and Written Opinion dated Jan. 16, 2018.

* cited by examiner

PRODUCT DISPLAY UNIT WITH VIBRATION SENSORS

RELATED APPLICATION

This application claims the benefit of U.S. Provisional Application No. 62/420,045 filed on Nov. 10, 2016, which is incorporated herein by reference in its entirety.

TECHNICAL FIELD

This invention relates generally to product display units and, more specifically, product display units with sensors.

BACKGROUND

Customers can become frustrated or discouraged while shopping if they cannot find the products that they wish to purchase. Customers may not be able to find the products they wish to purchase if the products are not properly stocked (e.g., a product display unit does not contain any of the desired product) or if the products are improperly located (e.g., Product$_1$ is located on a product display unit in a section designated for Product$_2$). When customers become frustrated and discouraged, they may have a poor shopping experience. Additionally, customers not being able to find the products they wish to purchase can result in decreased sales. Consequently, a need exists for systems that can monitor products on a sales floor.

BRIEF DESCRIPTION OF THE DRAWINGS

Disclosed herein are embodiments of systems, apparatuses, and methods pertaining to determining an action to be performed based on vibrations detected on a product display unit. This description includes drawings, wherein.

Figure 1:
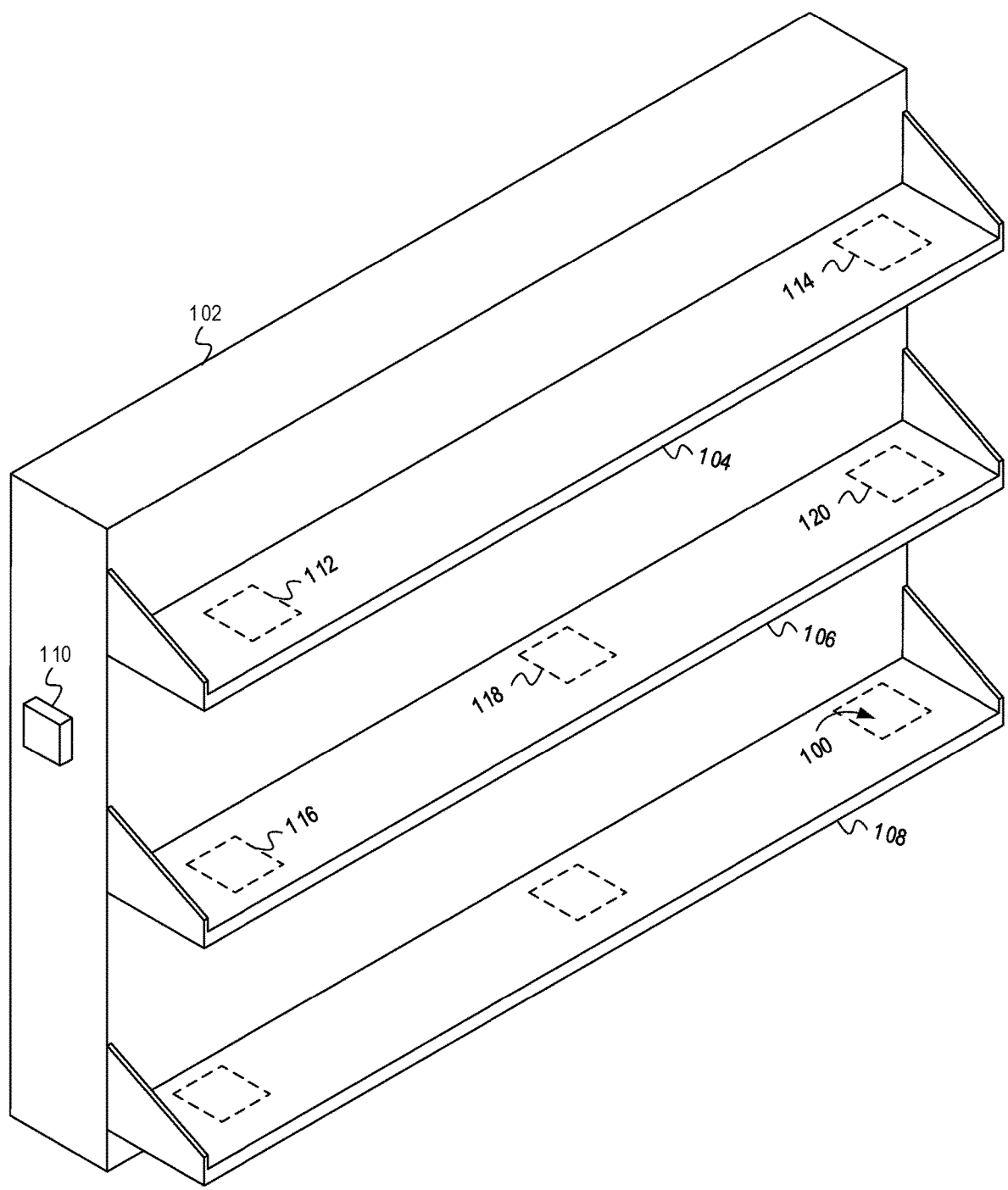
FIG. 1 depicts a product display unit 102 including vibration sensors 100, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determining an action to be performed based on vibrations detected on a product display unit. In some embodiments, a system for determining an action to perform based on vibrations detected on a product display unit comprises the product display unit, one or more vibration sensors, wherein the one or more vibration sensors are affixed to the product display unit and configured to detect vibration of the product display unit and transmit an indication of the vibration of the product display unit, and a control circuit, the control circuit communicatively coupled to the one or more vibration sensors and configured to receive, from the one or more vibration sensors, the indication of the vibration of the product display unit, estimate, based on the indication of the vibration of the product display unit a characteristic of at least one item on the product display unit, and determine, based on the characteristic of the at least on item on the product display unit, the action to be performed.

As previously discussed, customers may become frustrated and discouraged if they cannot locate the items that they wish to purchase. This often happens if products are improperly stocked, zoned, and/or located. Some embodiments seek to minimize or eliminate the occurrence of improperly stocked, zoned, and located products by monitoring products on product display units on a sales floor. Additionally, the methods, systems, and apparatuses disclosed herein can be used to monitor products in locations other than a sales floor (e.g., in a stockroom or a warehouse). In some embodiments, this monitoring is performed via vibration sensors affixed to a product display unit. Products being placed on, removed from, or moved on a product display unit cause vibration of the product display unit. The vibration sensors detect these vibrations. From these vibrations, it can be determined whether products are improperly stocked, zoned, and/or located. In some embodiments, if it is determined that a product is improperly stocked, zoned, and/or located, an action to be performed can be determined to properly stock, zone, and/or locate the product. The discussion of FIG. 1 provides an overview of a product display unit including vibration sensors, according to some embodiments.

FIG. 1 depicts a product display unit 102 including vibration sensors 100, according to some embodiments. The product display unit 102 can include shelves (as depicted in FIG. 1), hangers, baskets, or any other type or combination of product display mechanisms. Additionally, the product display unit 102 can be located on a sales floor, in a stockroom, in a warehouse, etc.

The example product display unit 102 depicted in FIG. 1 includes three shelves: a first shelf 104, a second shelf 106, and a third shelf 108. Each shelf includes vibration sensors 100. The vibration sensors 100 are affixed to the shelves and each shelf can include and suitable number and/or type of vibration sensors 100. For example, the first shelf 104 includes two vibration sensors 100 (a first vibration sensor 112 and a second vibration sensor 114), the second shelf 106 includes three vibration sensors 100 (a third vibration sensor 116, a fourth vibrations sensor 118, and a fifth vibration sensor 120), and the third shelf 108 includes three vibration sensors 100. The number and/or type of vibration sensors 100 on each shelf can be dependent upon the information to be gleaned from the vibration sensors 100, the type of products on the shelf, the number of products on the shelf, the type of product display unit 102, cost considerations, etc. For example, a greater number of vibration sensors 100 may provide more detailed or more accurate information regarding the characteristics of products on the product display unit 102.

Movement of products on the product display unit 102 (i.e., when products are added to, removed from, or moved) causes the product display unit 102 to vibrate. The vibration sensors 100 detect this vibration. The vibrations are indicative of characteristics of products on the product display unit 102. The characteristics can be a location, type, number, etc. of products on the product display unit. As one example, the relative time that vibrations are detected by the vibration sensors 100 is indicative of the location of the product (e.g., vibrations caused by movement of a product located left-of-center on the first shelf 104 would be detected by the first vibration sensor 112 before they are detected by the second vibration sensor 114). As a second example, different types of products cause the product display unit 102 to vibrate in different manners (e.g., a heavy product or a product made of metal would cause a greater vibration than a light product or a product with a cardboard container). As a third example, the number of products moved is related to the resultant vibration (e.g., moving three products would create a greater vibration than moving one product). As a fourth example, the total number of products on the shelf impacts the vibration detected by the vibration sensors (e.g., the greater the number of products on the shelf, the greater the damping of the vibrations).

In each of the examples provided above, wave propagation can be experimentally tested then modeled, for example, as a time-dependent differential equation. This model can account for densities of materials used in the product display unit 102 (e.g., a wood shelf or metal shelf), the weight of products on the product display unit 102, the distance between the vibration sensors 100, and the relative time that vibrations are detected at each of the vibration sensors 100. Additionally, or alternatively, the system can be calibrated using known tasks and known products. That is, vibration patterns can be modeled for different types of products and conditions (e.g., number of products on the shelf) by performing a known task with a known product, such as removing a box of pasta from a shelf that is substantially fully stocked. In such embodiments, an employee can specify a task and/or product and the resulting vibrations are detected and stored. In some embodiments, the employee can repeat the task multiple times to ensure an accurate vibration is recorded. In a similar embodiment, an employee can perform a predetermined set of tasks with a predetermined set of products to perform a calibration. The predetermined set of tasks and/or predetermined set of products can be chosen to provide baseline values with which real world data can be compared and analyzed.

In some embodiments, specific vibrations are associated with known characteristics. For example, a metal can may produce a known vibration in the product display unit 102. Additionally, or alternatively, data can be gathered over time, or tested in a controlled environment, and characteristics of products can later be inferred based on these test vibrations. For example, testing can be performed to monitor vibrations of the product display unit 102 when fully stocked by moving different products on the product display unit 102 in different ways.

In some embodiments, an action to be performed can be determined based on the vibrations (i.e., an action to be performed can be determined based on the characteristics of the products on the product display unit 102). The action to be performed can be a restocking action, a relocation action, an investigatory action, an ordering action, a zoning action, a pricing action, or any other suitable action. As one example, if the characteristics of the product(s) indicates that the product(s) needs to be restocked, the action to be performed can be a restocking action.

In some embodiments, the product display unit 102 can include the necessary hardware and/or software to determine actions to be performed. Alternatively, as depicted in FIG. 1, the product display unit 102 can include a transmitter or transceiver 110 that transmits indications of the vibrations to a device located remotely from the product display unit 102, such as a backend server or terminal carried by an employee, for determination of the action to be performed. In embodiments in which the product display unit includes the necessary hardware and/or software to determine actions to be performed, the transmitter or transceiver 110 can transmit a notification indicating the action to be performed to a terminal carried by an employee.

Although FIG. 1 depicts the sensors 100 located near the middle of the shelves (i.e., roughly equidistant from a front of the shelf and a back of the shelf), such a configuration is not required. Further, in some embodiments, it can be beneficial to locate the sensors 100 nearer the back of the shelf than the front of the shelf. Such a configuration may reduce the complexity of determining locations of products on the shelf.

Figure 2:
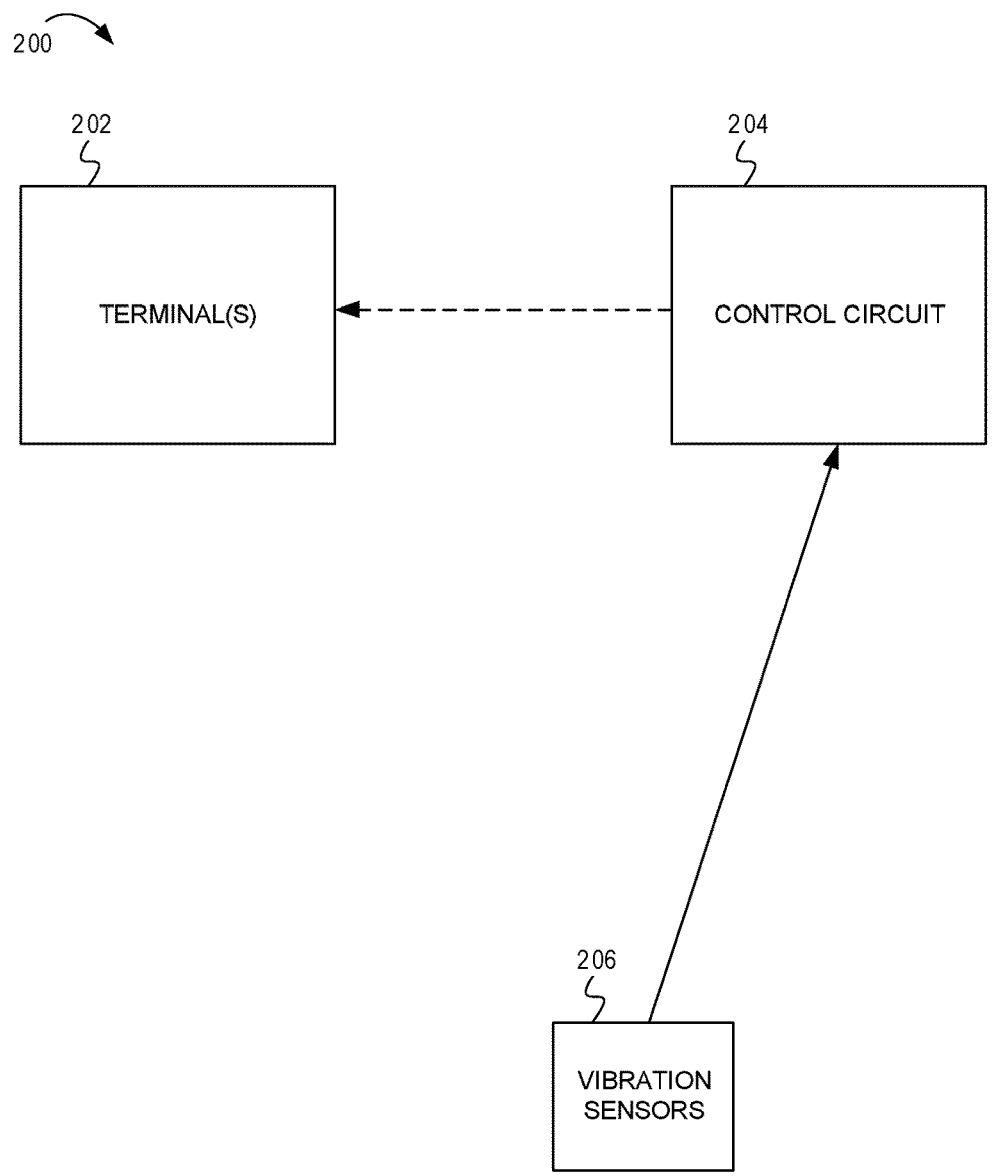
FIG. 2 is a block diagram of a system 200 for determining an action to perform based on an indication of vibration, according to some embodiments.

While the discussion of FIG. 1 provides an overview of a product display unit including vibration sensors, the discussion of FIG. 2 provides additional details regarding a system for determining actions to be performed based on vibrations detected in a product display unit.

FIG. 2 is a block diagram of a system 200 for determining an action to perform based on an indication of vibration, according to some embodiments. The system 200 includes vibration sensors 206 and a control circuit 204. The control circuit 204 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 204 is configured (for example, by using corresponding programming as will be well understood by those skilled in the art) to carry out one or more of the steps, actions, and/or functions described herein.

By one optional approach the control circuit 204 operably couples to a memory. The memory may be integral to the control circuit 204 or can be physically discrete (in whole or in part) from the control circuit 204 as desired. This memory can also be local with respect to the control circuit 204 (where, for example, both share a common circuit board, chassis, power supply, and/or housing) or can be partially or wholly remote with respect to the control circuit 204 (where, for example, the memory is physically located in another facility, metropolitan area, or even country as compared to the control circuit 204).

This memory can serve, for example, to non-transitorily store the computer instructions that, when executed by the control circuit 204, cause the control circuit 204 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The vibration sensors 206 are located on or near product display units. The vibration sensors 206 detect vibration of the product display unit caused by movement of products on the product display unit. The vibration sensors 206 transmit indications of the vibrations to the control circuit 204. The control circuit 204 receives the indications of the vibrations and estimates a characteristic associated with products on the product display unit. For example, the characteristics can be a type of a product or products on the product display unit, a number of products on the product display unit, a location of a products on the product display unit, etc. In some embodiments, the control circuit 204 estimates the characteristics by referencing a database. The database can include associations between vibrations and characteristics. Based on the characteristics, the control circuit 204 determines an action to be performed. For example, if the timing of vibrations received between different vibration sensors on the product display unit indicate that the products are not properly zoned (e.g., the products are not located near a leading edge of the product display unit), the action to be performed can be a zoning action. In some embodiments, the control circuit 204 determines the action to be performed by referencing the database. The database can include an association between characteristics and actions to be performed.

Additionally, in some embodiments, the system 200 can include terminal(s) 202 that are carried by employees. In such embodiments, the control circuit 204 can transmit an indication of the action to be performed to one or more of the terminal(s) 202. The control circuit 204 can transmit the indication of the action to be performed to all terminal(s) 202 or to one or more specific terminal(s) 202. For example, the control circuit 204 can select one or more of the terminal(s) 202 based on a location of the terminal(s) 202, an employee associated with the terminal(s) 202, etc.

Figure 3:
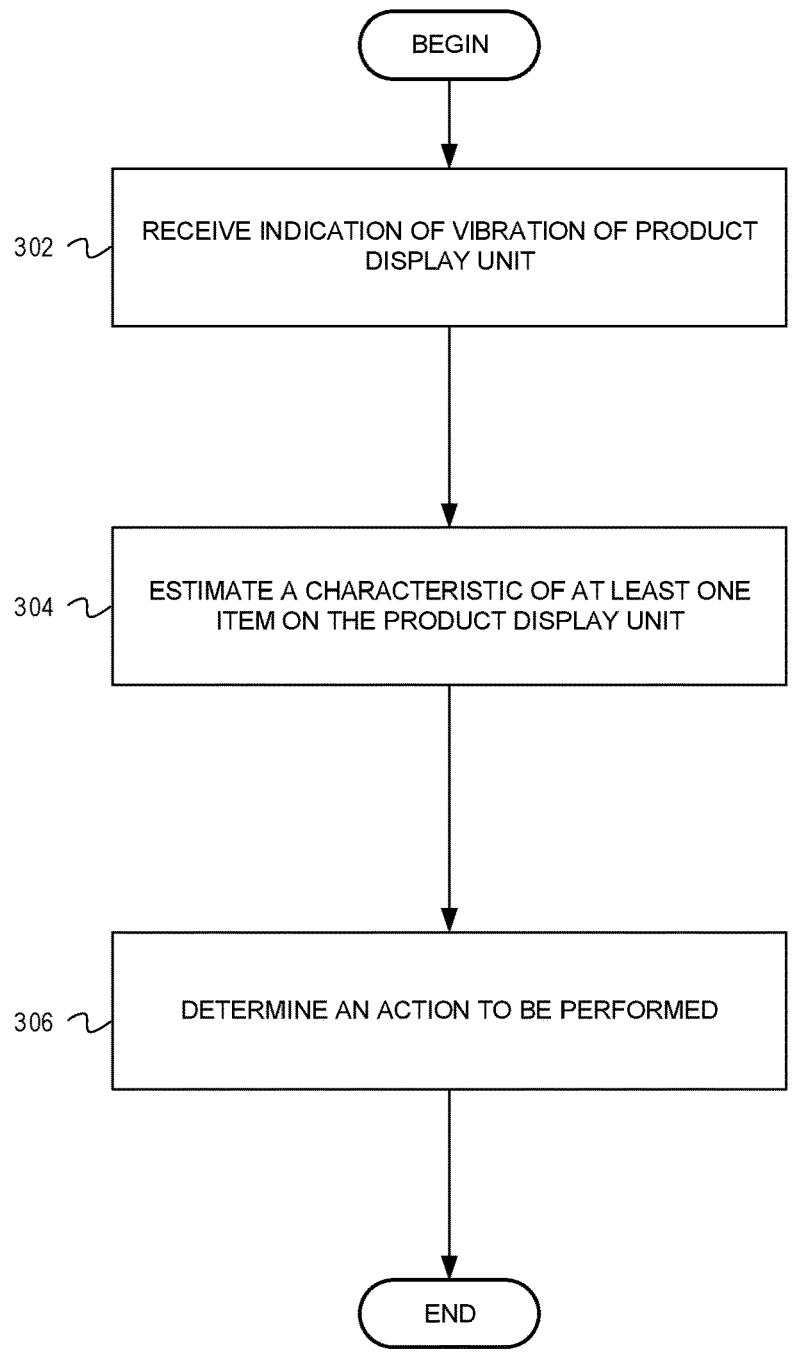
FIG. 3 is a flow chart depicting example operations for determining an action to perform based on an indication of vibration, according to some embodiments.

While the discussion of FIG. 2 provides additional details regarding a system for determining actions to be performed based on vibrations detected in a product display unit, the discussion of FIG. 3 provides additional detail regarding determination of an action to perform.

FIG. 3 is a flow chart depicting example operations for determining an action to perform based on an indication of vibration, according to some embodiments. The flow begins at block 302.

At block 302, indications of vibrations of a product display unit are received. For example, a control circuit can receive the indications of vibrations of the product display unit. The control circuit can receive the indications of vibrations from vibration sensors located on or near the product display unit. Movement of products on the product display unit (e.g., adding a product, removing a product from, or moving a product on the product display unit) cause the product display unit to vibrate. The control circuit can be local to the product display unit (e.g., each product display unit includes one or more control circuits) or remote from the product display unit (e.g., the control circuit can be located in the same location, such as a retail establishment, as the product display unit or a single control circuit can receive indications from vibration sensors located in a number of retail establishments). The flow continues at block 304.

At block 304, a characteristic of at least one item on the product display unit is estimated. For example, the control circuit estimates the characteristic of the at least one item on the product display unit. The at least one item can be any one or more products located on the product display unit. The characteristic can be a location of a product on the product display unit, a type of the product(s) on the product display unit, a number of products on the product display unit, etc. The control circuit estimates the characteristic based on the indications of the vibrations of the product display unit. In some embodiments, the control circuit references a database of indications of vibration and characteristics to estimate the characteristic of the at least one item. The control circuit can also use information in addition to the indications of the vibrations. As one example, the control circuit can estimate a type of the product based on a location of the vibration and a planogram. Further, based on the planogram, the control circuit can determine what products are expected to be located on the shelves in addition to the product in question. In this regard, the control circuit can not only estimate the type of the product based on the location of the vibration, but account for damping based on what products are expected to be on the shelf. Additionally, in some embodiments, the control circuit can also determine the quantity of each of the products that are expected to be on the shelf based on sales data (e.g., point-of-sale data). In such embodiments, the sales data may allow the control circuit to more accurately estimate the type of the product. The flow continues at block 306.

At block 306, an action to be performed is determined. For example, the control circuit can determine the action to be performed. The control circuit determines the action to be performed based on the characteristic of the at least one item. The action to be performed can be a restocking action, a relocation action, an investigatory action, an ordering action, a zoning action, a pricing action, or any other suitable action. In some embodiments, the control circuit can determine the action to be performed by referencing a database of characteristics and actions to be performed. Further, the control circuit can determine the action be performed based on information in addition to the characteristic of the at least one item. For example, the control circuit can consider point-of-sale data when determining the action to be performed.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

In some embodiments, a system for determining an action to perform based on vibrations detected on a product display unit comprises the product display unit, one or more vibration sensors, wherein the one or more vibration sensors are affixed to the product display unit and configured to detect vibration of the product display unit and transmit an indication of the vibration of the product display unit, and a control circuit, the control circuit communicatively coupled to the one or more vibration sensors and configured to receive, from the one or more vibration sensors, the indication of the vibration of the product display unit, estimate, based on the indication of the vibration of the product display unit a characteristic of at least one item on the product display unit, and determine, based on the characteristic of the at least on item on the product display unit, the action to be performed.

In some embodiments, a method for determining an action to be performed based on vibrations detected on a product display unit, the method comprising receiving, from one or more vibration sensors that are affixed to the product display unit, a characteristic of at least one item on the product display unit, and determine, based on the characteristic or at least one item on the product display unit, the action to be performed.

What is claimed is:

1. A system for determining an action to be performed based on vibrations detected on a product display unit, the system comprising:
the product display unit;
one or more vibration sensors, wherein the one or more vibration sensors are affixed to the product display unit and configured to:
detect vibration of the product display unit; and
transmit an indication of the vibration of the product display unit;
a control circuit, the control circuit communicatively coupled to the one or more vibration sensors and configured to:
receive, from the one or more vibration sensors, the indication of the vibration of the product display unit;
estimate, based on the indication of the vibration of the product display unit, a type of product located on the product display unit;
identify the product display unit;
determine, based on the identification of the product display unit and a planogram, an expected product type for the product display unit;
determine, based on the type of the product located on the product display unit and the expected product type for the product display unit, that the type of the product located on the product display unit is different than the expected product type for the product display unit;
determine, based on the determination that the type of the product located on the product display unit is different than the expected product type for the product display unit, an action to be performed; and
cause transmission of an indication of the action to be performed.

2. The system of claim 1, wherein the product display unit includes a first end and a second end, and wherein a first sensor of the one or more sensors is located towards the first end and a second sensor of the one or more sensors is located towards the second end.

3. The system of claim 2, wherein a third sensor of the one or more sensors is located between the first sensor and the second sensor.

4. The system of claim 1, wherein the control circuit is further configured to:
determine, based on the type of the product, that an incorrect product is located on the product display unit.

5. The system of claim 1, wherein the control circuit is further configured to:
estimate, based on the indication of the vibration of the product display unit, a characteristic of at least one product on the product display unit.

6. The system of claim 5, wherein the characteristic of the at least one product on the product display unit is a quantity of products on the product display unit.

7. The system of claim 5, wherein the characteristic of at least one product on the product display unit is a location of the at least one item on the product display unit.

8. The system of claim 1, wherein the action to perform is a relocation action.

9. The system of claim 1, wherein the product display unit is identified by a location of the product display unit in a retail facility.

10. The system of claim 1, wherein the indication of the vibration of the product display unit includes a magnitude of the vibration of the product display unit, and wherein the type of product located on the product display unit is estimated based on the magnitude of the vibration of the product display unit.

11. A method for determining an action be performed based on vibrations detected on a product display unit, the method comprising:
receiving, from one or more vibration sensors that are affixed to the product display unit, an indication of vibration of the product display unit;
estimating, based on the indication of the vibration of the product display unit, a type of product located on the product display unit;
identifying the product display unit;
determining, based on the identification of the product display unit and a planogram, an expected product type for the product display unit;
determining, based on the type of the product located on the product display unit and the expected product type for the product display unit, that the type of the product located on the product display unit is different than the expected product type for the product display unit;
determining, based on the determination that the type of the product located on the product display unit is different than the expected product type for the product display unit, the action to be performed; and
transmitting, to one or more terminals, an indication of the action to be performed.

12. The method of claim 11, wherein the product display unit includes a first end and a second end, and wherein a first sensor of the one or more sensors is located toward the first end and a second sensor of the one or more sensors is located towards the second end.

13. The method of claim 12, wherein a third sensors of the one or more sensors is located between the first sensor and the second sensor.

14. The method of claim 11, further comprising:
determining, based on the type of the product located on the product display unit, that an incorrect product is located on the product display unit.

15. The method of claim 11, further comprising:
estimating, based on the indication of the vibration of the product display unit, a characteristic of at least one product on the product display unit.

16. The method of claim 15, wherein the characteristic of the at least one product on the product display unit is a quantity of products on the product display unit.

17. The method of claim 16, wherein the characteristic of the least one item on the product display unit is a location of the at least one item on the product display unit.

18. The method of claim 11, wherein the action to perform is a relocation action.

19. The method of claim 11, wherein the product display unit is identified by a location of the product display unit in a retail facility.

20. The method of claim 11, wherein the indication of the vibration of the product display unit includes a magnitude of the vibration of the product display unit, and wherein the type of product located on the product display unit is estimated based on the magnitude of the vibration of the product display unit.

* * * * *